US012627936B2

(12) United States Patent
Garudadri et al.

(10) Patent No.: US 12,627,936 B2
(45) Date of Patent: May 12, 2026

(54) REAL-TIME MULTIRATE MULTIBAND AMPLIFICATION FOR HEARING AIDS

(71) Applicant: THE REGENTS OF THE UNIVERSITY OF CALIFORNIA, Oakland, CA (US)

(72) Inventors: Harinath Garudadri, La Jolla, CA (US); Alice Sokolova, La Jolla, CA (US); Frederic Harris, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 228 days.

(21) Appl. No.: 18/695,558

(22) PCT Filed: Oct. 31, 2022

(86) PCT No.: PCT/US2022/048465

§ 371 (c)(1),
(2) Date: Mar. 26, 2024

(87) PCT Pub. No.: WO2023/076691

PCT Pub. Date: May 4, 2023

(65) Prior Publication Data

US 2025/0126417 A1 Apr. 17, 2025

Related U.S. Application Data

(60) Provisional application No. 63/273,512, filed on Oct. 29, 2021.

(51) Int. Cl.
*H04R 25/00* (2006.01)

(52) U.S. Cl.
CPC ......... *H04R 25/505* (2013.01); *H04R 25/356* (2013.01); *H04R 2225/43* (2013.01); *H04R 2430/03* (2013.01)

(58) Field of Classification Search
CPC ............ H04R 2225/43; H04R 2430/03; H04R 25/356; H04R 25/505

(Continued)

(56) References Cited

U.S. PATENT DOCUMENTS

2006/0109941 A1 * 5/2006 Keele, Jr. ............ H03H 17/028 375/350
2012/0163307 A1 6/2012 Wang et al.

(Continued)

OTHER PUBLICATIONS

Garudadri, H., "A realtme, open-source speech-processing platform for research in hearing loss compensation," in 2017 51st Asilomar Conference on Signals, Systems, and Computers, 2017, pp. 1900-1904.

(Continued)

*Primary Examiner* — Phylesha Dabney
(74) *Attorney, Agent, or Firm* — Kaplan Breyer Schwarz LLP

(57) ABSTRACT

In accordance with a method for performing frequency subchannelization, a digital signal is received at an original sampling rate. A plurality of multirate frequency channels is produced by dividing the digital signal into an integer number of multirate frequency channels such that a sampling rate of each of the multirate frequency channels is proportional to a center frequency of the frequency channel. Signal processing is performed on each of the multirate frequency channels. The original sampling rate is reconstructed using the multirate frequency channels.

11 Claims, 15 Drawing Sheets

(58) Field of Classification Search
USPC .......................................................... 381/317
See application file for complete search history.

(56) References Cited

U.S. PATENT DOCUMENTS

| | | | | |
|---|---|---|---|---|
| 2013/0260821 | A1 | 10/2013 | Deparis et al. | |
| 2017/0055278 | A1 | 2/2017 | Jechoux et al. | |
| 2020/0008707 | A1 * | 1/2020 | Li | A61B 8/5276 |
| 2021/0168001 | A1 | 6/2021 | Agee | |

OTHER PUBLICATIONS

Grimm, G., et al., "Implementation and evaluation of an experimental hearing aid dynamic range compressor", Threshold, vol. 80, No. 90, 2015, pp. 996-999.
Neuman, A. C., et al., "The effect of compression ratio and release time on the categorical rating of sound quality," The Journal of the Acoustical Society of America, vol. 103, No. 5, 1998, pp. 2273-2281.
Pisha, L., et al., "A wearable, extensible, open-source platform for hearing healthcare research," IEEE Access, vol. 7, 2019, pp. 162083-162101.
Jenstad, L. M., et al., "Quantifying the effect of compression hearing aid release time on speech acoustics and intelligibility," Journal of Speech, Language, and Hearing Research, vol. 48, Issue 3, 2005, pp. 651-667.

* cited by examiner

REAL-TIME MULTIRATE MULTIBAND AMPLIFICATION FOR HEARING AIDS

CROSS-REFERENCE TO RELATED APPLICATION

This application claims the benefit of U.S. Provisional Application Ser. No. 63/273,512, filed Oct. 29, 2022, the contents of which are incorporated herein by reference.

GOVERNMENT FUNDING

This invention was made with government support under DC015046 and DC015436 awarded by the National Institutes of Health, and under IIS1838830 awarded by the National Science Foundation. The government has certain rights in the invention.

BACKGROUND

Studies have shown that only about one-third of individuals who have hearing loss utilize a hearing aid. Among those individuals, around one-third do not use their hearing aids regularly. The main reason for this disuse is often the dissatisfaction with the speech quality offered by modern hearing aids, especially in noisy environments where hearing-impaired individuals need them the most. Achieving music appreciation with hearing aids is an even greater challenge.

One highly effective approach for improving the audibility of sound for hearing impaired users is called Wide Dynamic Range Compression (WDRC), which is the amplification and reduction of the dynamic range, or volume swing, of an audio signal. WDRC involves amplifying quiet signals to improve audibility, and simultaneously decreasing the volume of loud signals to reduce discomfort to a hearing-impaired user.

Human hearing, however, is inherently frequency-dependent. The human cochlea perceives finer pitch variation at lower frequencies than at higher frequencies. Additionally, hearing loss is also typically frequency dependent, affecting certain frequency ranges more than others. For this reason, the compression gains needed to compensate for hearing loss vary across different frequency bands, necessitating a multiband approach to WDRC. Studies have shown that a greater number of frequency bins increases researchers' flexibility, especially for unusual hearing loss patterns.

SUMMARY

In one aspect a Real-time Multirate Multiband Amplification system is presented herein which addresses the need for finer, more precise gain control in a hearing aid device. The system design provides higher flexibility and accuracy than currently available on open-source platforms. In one implementation the system includes:

1) A Multirate Audiometric Filter Bank, offering highly accurate low-latency subband decomposition which can be used for a variety of hearing enhancement algorithms. In this paper, we present a half-octave realization, centered at the standard audiometric frequencies of 250, 375, 500, 1000, 1500, 2000, 3000, 4000, 6000, and 8000 Hz.
2) A Multirate Automatic Gain Control system for WDRC that accurately fulfills the static and dynamic properties specified by audiologists, which include steady state Gains, as well as the dynamics of the Gains realized as the attack and release times of the said Gains in each subband.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DETAILED DESCRIPTION

Introduction

Figure 1:
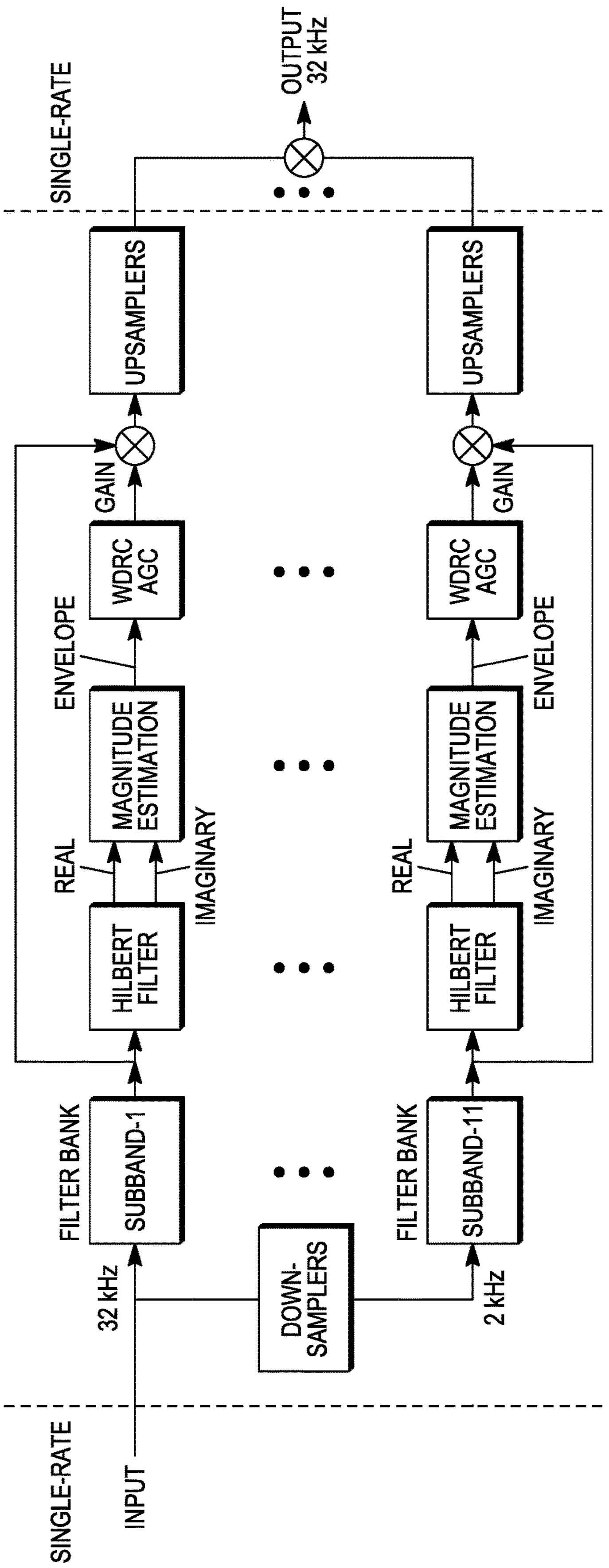
FIG. 1 shows a block diagram of one example of a subband amplification system in accordance with the systems and principles described herein.

FIG. 1 shows a block diagram of one example of a subband amplification system in accordance with the systems and principles described herein. This system accepts an audio signal sampled at 32 kHz, performs frequency decomposition on the signal to separate it into different frequency channels or bands with different sampling rates, and transitions from single to multirate processing, where each channel is individually processed. The system then computes the gains necessary for Wide Dynamic Range Compression in each band. The final stage converts all multirate outputs back to the original sampling rate and combines the bands into a final output. Multirate processing is an important feature of our design, and is instrumental in ensuring real-time operation of the system and reducing power consumption.

In one particular implementation presented for illustrative purposes and not as a limitation on the systems and techniques described herein, the multirate amplification system is implemented and tested on the Open Speech Platform (OSP)—an open source suite of software and hardware tools for performing research on emerging hearing aids and hearables. The OSP suite includes a wearable hearing aid, a wireless interface, and a set of hearing enhancement algorithms.

Filter Bank

Figure 2:
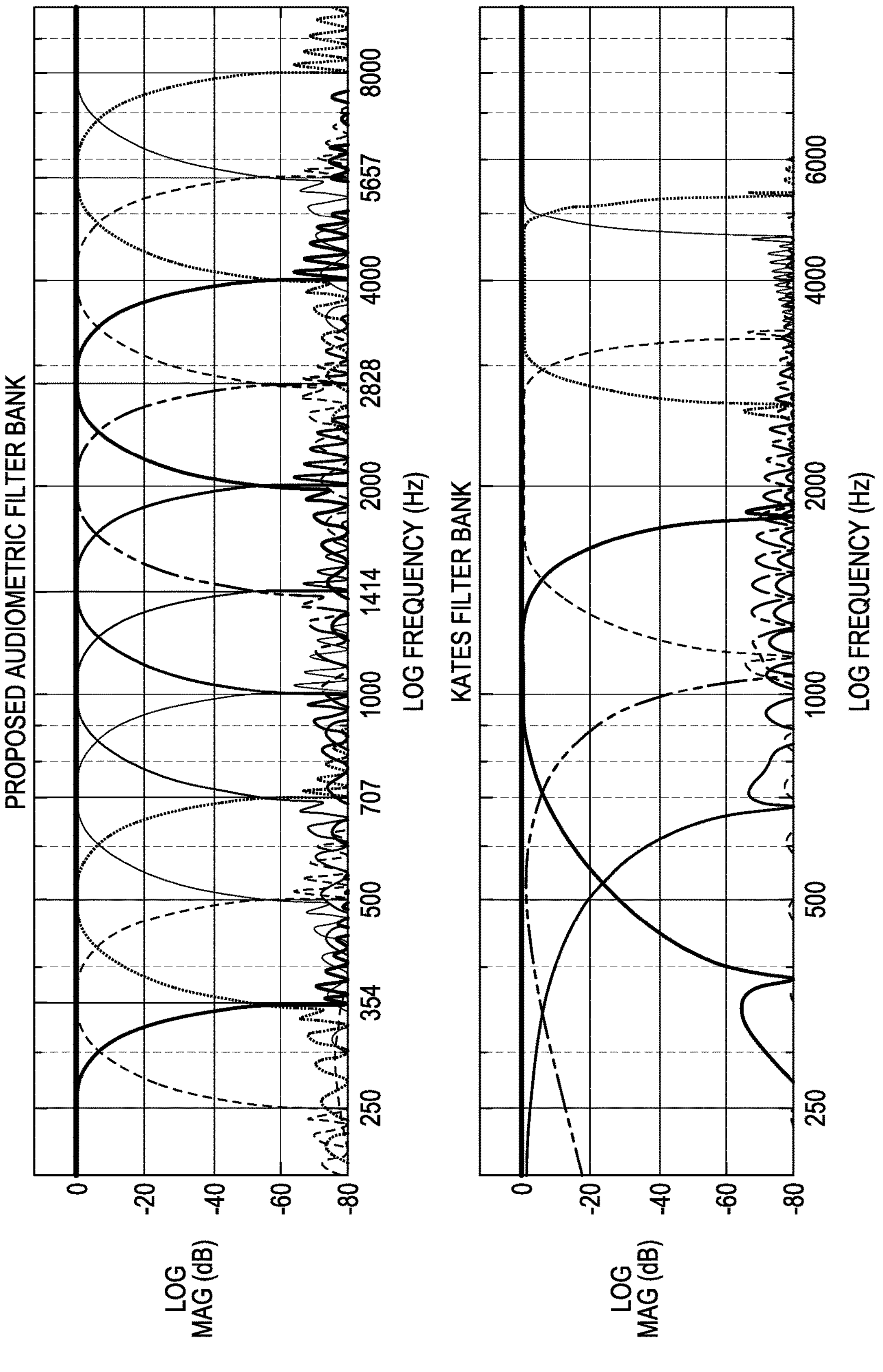
FIG. 2 shows the magnitude response and composite responses for one example of a multirate filter bank.

FIG. 2 shows the magnitude response and composite responses for one example of a multirate filter bank, also known as a channelizer, for subband decomposition, which in this example is an eleven-band filter bank. Subband decomposition is the process of separating a signal into multiple frequency bands or channels, and is used in many applications, including hearing aids. Various properties of this particular example of a multirate filter bank are described below, which are presented for illustrative purposes only and not as a limitation on the systems and techniques described herein.

The structure of an audiometric filter bank reflects the spectral nature of the human cochlea, which is inherently logarithmic. The American Speech-Language-Hearing Association (ASHA) defines a set of ten audiometric frequencies used for pure-tone audiometry, which are 0.25, 0.5, 1, 1.5, 2, 3, 4, 6, and 8 kHz. These frequencies closely resemble a half-octave logarithmic sequence, and are commonly targeted for audiometric filter banks. However, every other frequency is not a true half-octave frequency, but rather a simplified integer approximation. The audiometric filter bank is a true half-octave channelizer, making it uniformly distributed on the logarithmic scale, as seen from FIG. 2*a*. It spans a range of 0.25 to 8 kHz, which produces eleven bands. Although the true half octave center frequencies diverge from the rounded ASHA approximations, they are functionally the same, and for the sake of simplicity we will be referring to each individual band by its approximate audiometric frequency. More generally, the filter bank may produce a different number of bands, provided that it produces an integer number of bands per octave.

The American National Standards Institute (ANSI) S1.11 defines specifications for Half-Octave Acoustic filters. The standard includes three classes of filters—class 0, 1, and 2, where class 0 has the strictest tolerances and class 2 has the most lax tolerances. The filter bank meets class 0 standards—the highest of the three. Accordingly, each band of the filter bank has −75 dB sidelobe attenuation, and the in-band ripple is within ±0.15 dB. The ripple of the composite response of the channelizer is also within ±0.15 dB. It should be noted that as used herein ANSI generally refers to the ANSI s3.22 standard, unless otherwise stated.

FIG. 2 shows the multirate audiometric filter bank (top) and the Kates Filter bank (bottom) both in the logarithmic scale. The vertical dashed lines represent different sampling rates used in the filter bank. As seen from FIG. 2, filters which are symmetrical and proportionate bandwidth on the logarithmic scale for the multi-rate system, compared with the Kates filter bank. We designed the proportionate bandwidth and proportionate spacing for the multirate bandpass filters by convolving a lowpass and a highpass filter for each band. A more difficult challenge, though, is achieving signal reconstruction. A filter bank has perfect reconstruction if the sum of all outputs is equal to the original input signal. In the frequency domain, this means the composite frequency response of the filter bank is a flat line spanning all frequencies, as shown in FIG. 2.

We ensure that our filter bank has perfect reconstruction by employing complementary filter design. Complementary filters are two filters the sum of which is an all-pass filter. For any highpass or lowpass filter, its complement can be found by subtracting it from an all-pass filter, which is simply an impulse in the time domain. We designed all neighboring filter edges to be complements of each other, ensuring that their sum is an all-pass filter, which guarantees signal reconstruction. The channelizer offers perfect reconstruction within ±0.15 dB.

It is well known in the signal processing community that the sharper a digital filter is, the more coefficients it requires. As seen from FIG. 2, the audiometric channelizer requires very narrow and sharp filters—the lowest center frequency (0.25 kHz) is 32 times smaller than the highest center frequency (8 kHz), and at a 32 kHz sampling rate, the width of the narrowest filter is only 1/64 of the entire signal bandwidth. A conventional implementation of such narrow filters would result in too much latency to meet real-time processing deadlines, and would require excessive processing power.

The multirate filter bank dramatically reduces both power consumption and latency by employing multirate signal processing. Compared to a single-rate implementation, multirate processing reduces the power consumption by a factor of 13.7, and reduces latency from 32 ms down to 5.4 ms.

The motivation behind multirate processing is to decrease the complexity of a filter by reducing the sampling rate. Table 1 lists the number of taps needed to implement the filters shown in FIG. 2 at a single sampling rate of 32 kHz. As the filters becomes narrower and sharper, they require an exponentially increasing number of taps, reaching impractical values at the lowest frequencies.

TABLE 1

| | Filter Taps | | |
|---|---|---|---|
| Filter Band: | Single-rate | Multirate | Sampling rate |
| 8 kHz | 53 | 53 | 1 |
| 6 kHz | 77 | 77 | 1 |
| 4 kHz | 154 | 77 | 1/2 |
| 3 kHz | 154 | 77 | 1/2 |
| 2 kHz | 308 | 77 | 1/4 |
| 1.5 kHz | 308 | 77 | 1/4 |
| 1 kHz | 616 | 77 | 1/8 |
| 0.75 kHz | 616 | 77 | 1/8 |
| 0.5 kHz | 1232 | 77 | 1/16 |
| 0.375 kHz | 1232 | 77 | 1/16 |
| 0.25 kHz | 1232 | 77 | 1/16 |

However, the complexity of a filter can be decreased by reducing the sampling rate. For a given bandpass filter, the relative bandwidth is narrower at a higher sampling rate and wider at a lower sampling rate. Thus, a filter spanning a fixed range of frequencies becomes relatively wider as the sampling rate decreases. As the relative filter bandwidth increases, the numbers of taps proportionately decrease. For example, when the sampling rate of a filter is decreased by half, the relative bandwidth of the filter doubles, and the number of taps needed to implement it is also halved.

We exploit the unique structure of the multirate, audiometric filter bank to map each frequency octave to a sampling rate. The audiometric channelizer is a half-octave filter bank spanning a frequency range of about 5 octaves, from 250 Hz to 8000 Hz. An octave is a logarithmic unit defined as the difference between two frequencies separated by a factor of two, and a half-octave is the difference between two frequencies separated by a factor of 2. Thus, a half-octave filter bank is binary logarithm and the bandwidth of any two filters an octave apart differs by a factor of two.

As such, we are able to map each octave of the channelizer to a different sampling rate. We start by designing two bandpass filters at the original sampling rate that span one octave. The next two filters are one octave below, are half as wide, and would require double the number of taps. However, if we lower the sampling rate of the lower octave, the number of taps would decrease by half, resulting in filters of the same length as the ones we started with. Following this pattern, we are able to design all the filters in the audiometric channelizer using the same number of coefficients for each filter.

Table 1 compares a single-rate versus a multirate implementation of the channelizer. In the single-rate case, as the bandwidth of the filters is halved for every octave, the number of filter coefficients doubles for every octave. However, in the multirate implementation, we do not increase the filter complexity because the decrease in a filter's bandwidth is compensated by a decrease in the sampling rate. (The 8 kHz band is an exception because it is a highpass rather than a bandpass filter.)

Figure 3:
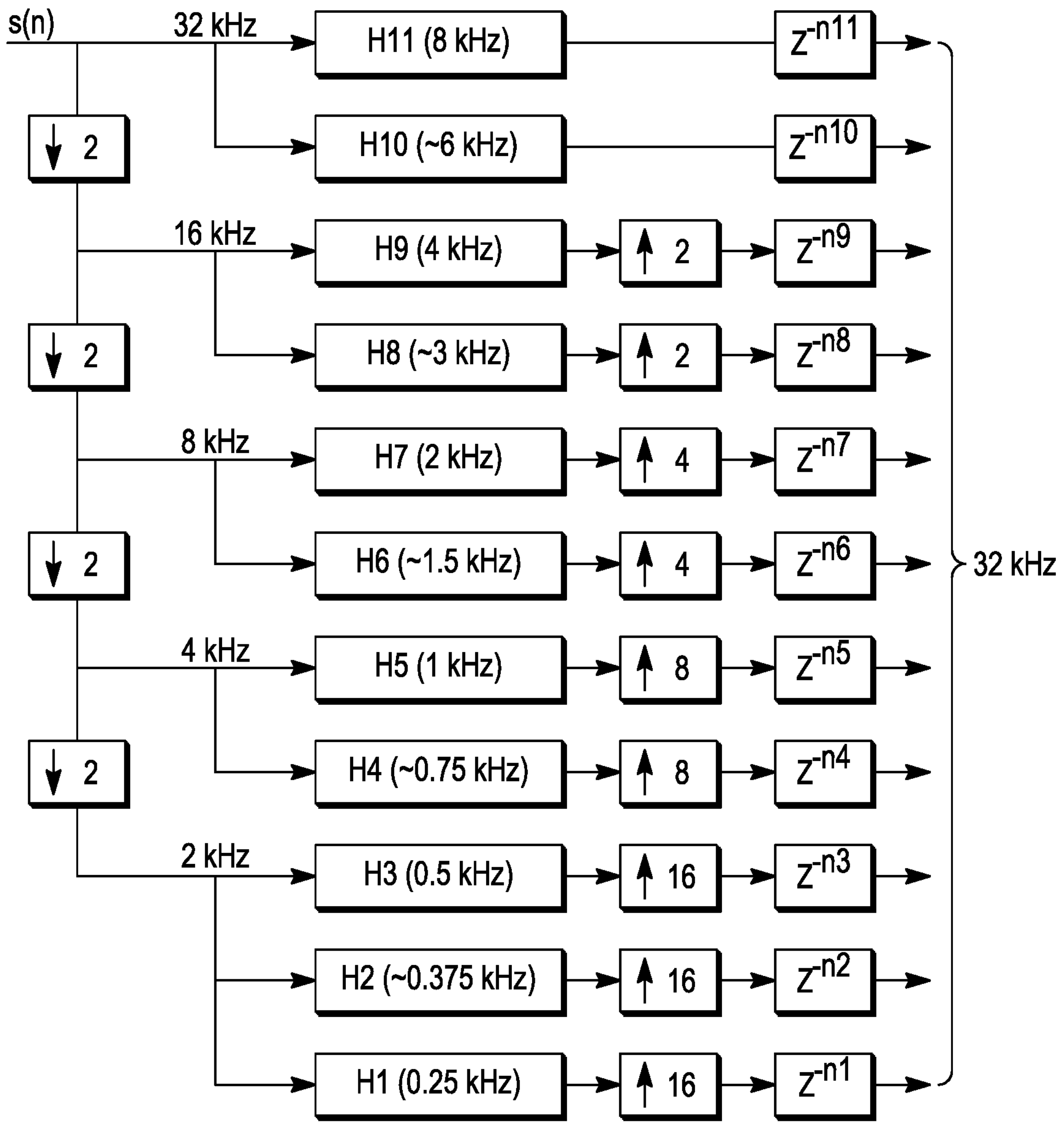
FIG. 3 shows a block diagram of one example of the multirate filter bank.

FIG. 3 shows a block diagram of one example of the audiometric filter bank. First the input signal is separated into different sampling rates using downsamplers. Then the inputs are passed through the bandpass filters. Lastly, the outputs are brought back to the original sampling rate using upsamplers. The five different sampling rates used in the channelizer are represented with dotted vertical lines in FIG. 2. According to the Nyquist Theorem, for any given sampling rate $f_s$, the only frequencies that can be observed are those lying between $-f_s/2$ and $+f_s/2$. Thus, each line represents the frequency limit of each different sampling rate. For the purposes of space, however, the original sampling rate, spanning $-f_s/2$ to $+f_s/2$, is not explicitly shown in FIG. 2. According to the Nyquist theorem, any frequency band which lies to the left of a dotted line can be processed at that respective sampling rate without aliasing distortion. However, resamplers are not ideal, and require constraints on overlapping transition bandwidths.

Conventionally, downsampling is performed by passing a signal through an antialiasing filter, and then decimating it. Similarly, conventional upsampling is performed by zero-packing a signal, and then passing it through an interpolating filter. As such, the complexity of conventional resamplers strongly depends on their resampling ratio-a high-ratio downsampler would require a sharp antialiasing filter to remove all unwanted frequencies, and a high-ratio upsampler would require a sharp interpolating filter to remove spectral signal copies. As before, sharp antialiasing and interpolating filters would require many taps, negating the power and latency benefits of multirate processing.

We combat this issue by performing resampling in multiple stages. Since all of our resamplers are multiples of two, we cascade multiple 1:2 or 2:1 resamplers to achieve the desired resampling ratio. 1:2 and 2:1 resamplers require only a short half-band filter for anti-aliasing and interpolating, which allows us to achieve high reductions of complexity.

Figure 4:
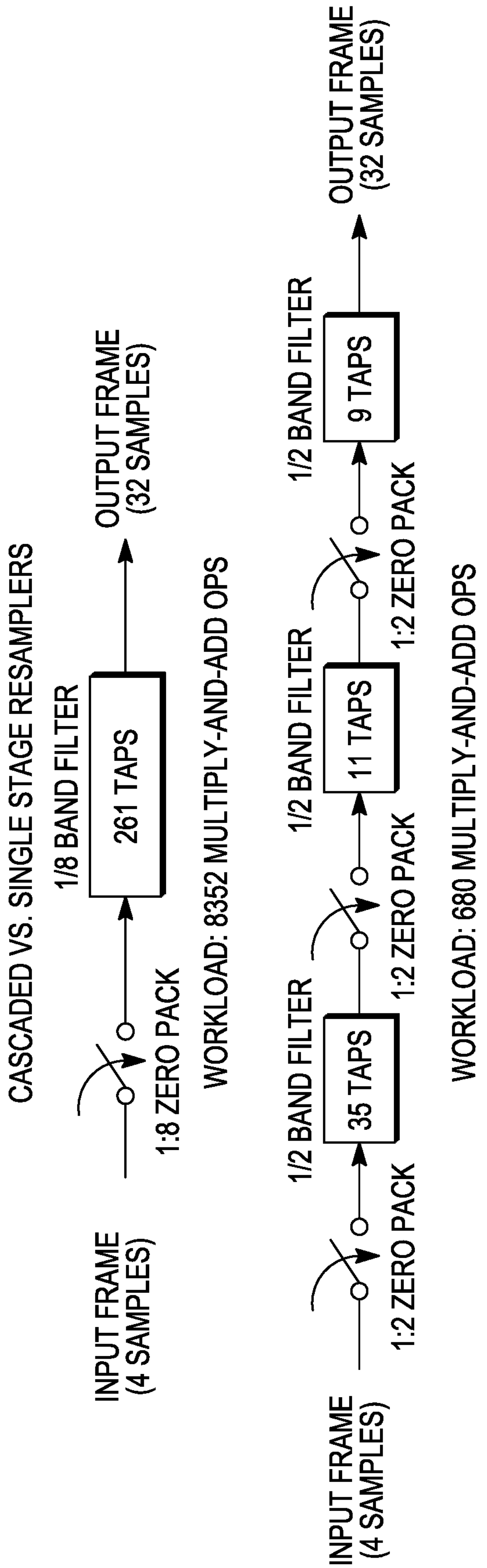
FIG. 4 compares a single-stage (top) and a cascaded implementation of a 1:8 upsampler (bottom).

FIG. 4 compares a single-stage (top) and a cascaded implementation of a 1:8 upsampler (bottom). A ⅛ band filter suitable for this resampler would require about taps. The number of multiply-and-add operations, equal to the frame size multiplied by the number of filter coefficients, would equal to 8352 operations per 32-sample output frame. However, this upsampler can be split into three 1:2 upsamplers, each containing a half-band filter, and after each upsampling stage, the transition bandwidth of the interpolating filter can be increased, which reduces complexity. As such, a cascaded 1:8 upsampler requires only 680 multiply-and-add operations.

Figure 5:
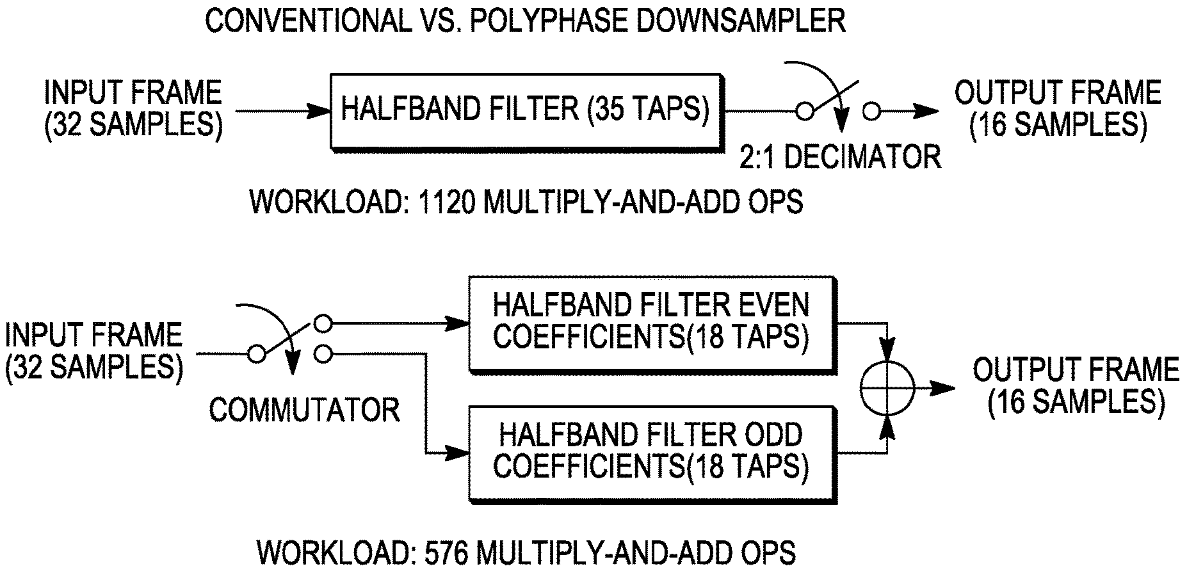
FIG. 5 compares a conventional and a polyphase 2:1 downsampler in one illustrative example.

We further reduce the complexity of the resamplers by employing polyphase filtering. Conventional resamplers perform many redundant computations, such as computing samples which will be discarded, or computing samples which are known to be zero. Polyphase filtering eliminates these redundant computations by splitting a single filter into multiple paths and employing the Noble identity to rearrange filtering and resampling. FIG. 5 compares a conventional (top) and a polyphase 2:1 downsampler (bottom). Polyphase resamplers always perform filtering at the lower of their input/output rate, and reduce the complexity of resampling by approximately a factor of M, where M is the resampling ratio.

We estimate the cumulative power consumption of the filter bank by computing the total number of multiply-and-accumulate operations per one output sample. For a filter running at a single sampling rate, the number of operations per sample is simply equal to the number of filter taps. However, in a multirate system, samples are continuously removed and added, which makes it impossible to match an input sample to a single output sample. As such, we compute the number of operations per sample of the multirate channelizer by calculating the total number of operations per input frame, and then normalizing by the input frame size. For each stage of the filter bank, we track the current frame size and the cumulative operations count. Due to the multirate structure of the channelizer, normalization by frame size results in a fractional number of operations per sample.

Table 2 compares the total number of multiply-and-accumulate operations per sample for a single-rate and multirate implementation of the channelizer. The multirate operations estimate accounts for all filters and resamplers. Our evaluations show that compared to a conventional approach, the multirate filter bank offers 13.7 improvement in complexity. For a wearable battery-operated system, power consumption and processing capabilities are of critical importance. Reducing the number of operations improves battery-life and frees processing power for other tasks.

TABLE 2

| | Operations per sample: | | |
|---|---|---|---|
| Filter Band: | Single-rate | Multirate | Ratio: |
| 8 kHz | 53 | 53 | 1x |
| 6 kHz | 77 | 77 | 1x |
| 4 kHz | 154 | 74.5 | 2.07x |
| 3 kHz | 154 | 56.5 | 2.73x |
| 2 kHz | 308 | 43.25 | 7.12x |
| 1.5 kHz | 308 | 34.25 | 8.99x |
| 1 kHz | 616 | 26.63 | 23.14x |
| 0.75 kHz | 616 | 22.13 | 27.84x |

TABLE 2-continued

| | Operations per sample: | | |
|---|---|---|---|
| Filter Band: | Single-rate | Multirate | Ratio: |
| 0.5 kHz | 1232 | 18.31 | 67.28x |
| 0.375 kHz | 1232 | 16.06 | 76.7x |
| 0.25 kHz | 1232 | 16.06 | 76.7x |
| Total: | 5982 | 437.69 | 13.67x |

As seen from FIG. 3, different frequency bands follow different signal paths and as such, experience varying amounts of delay. Because of the resamplers and lower sampling rates, lower frequency bands incur more delay than higher frequencies. The highest frequency bands (8 kHz and 6 kHz) experience only a few milliseconds of delay. However, the 0.5 kHz, 0.375 kHz, and the 0.25 kHz bands experience over 30 milliseconds of latency. This disparity causes a phase offset among the eleven bands and causes distortion in the composite frequency response. To certain listeners, this phase disparity sounds like an echo or a distorted sound timbre.

Figure 6:
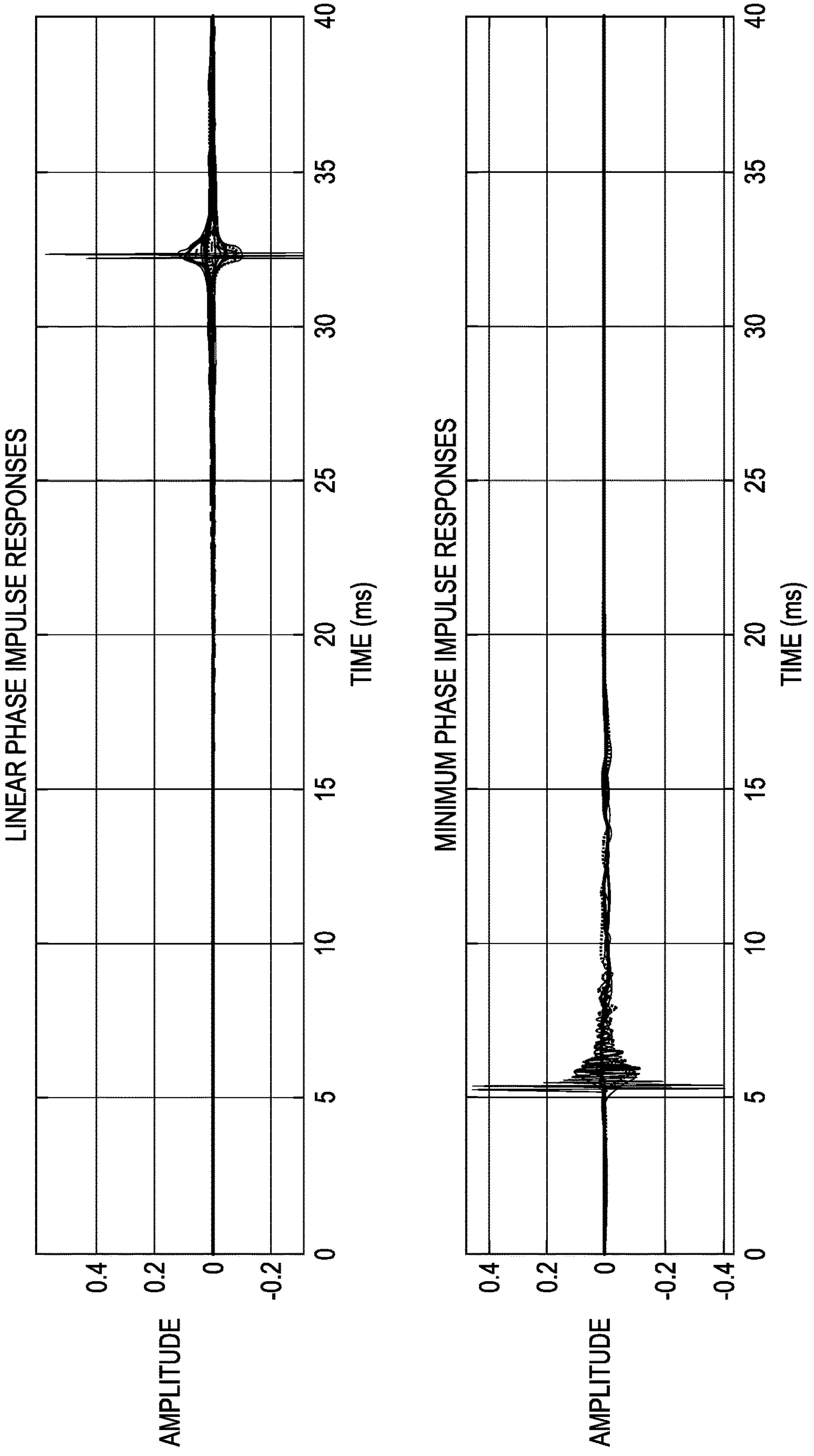
FIG. 6 compares the impulse responses of a linear phase implementation (top) and a minimum phase implementation (bottom) of the illustrative multirate filter bank.

In order to eliminate this latency disparity, we realign the bands by inserting delays into the signals' paths, as seen in FIG. 3, such that higher frequency bands are delayed until the lowest frequency bands arrive. FIG. 6 (top) shows the aligned impulse responses of the filter bank. Although the solution above preserves perfect reconstruction, the latency far exceeds real-time operation requirements. Conventionally, the latency limit for a real-time hearing aid is considered to be 10 milliseconds. As seen from FIG. 6 (top), the latency of the aligned channelizer is about 32 milliseconds. We resolve this issue by converting the filters from linear phase to minimum phase. A minimum phase filter has the same magnitude response as a linear phase filter, but the lowest possible delay. A filter can be converted from linear phase to minimum phase by reflecting all roots which lie outside the unit circle.

FIG. 6 (bottom) shows the aligned impulse responses of the minimum phase filter bank. As seen from FIG. 6, converting the filters from linear to minimum phase dramatically decreases the delay of each band. While retaining the same functionality as a linear phase filter bank, the minimum phase filter bank has a latency of only 5.4 ms, compared to 32 ms, which makes it suitable for real-time applications.

Wide Dynamic Range Compression (WDRC)

WDRC is a type of automatic gain control (AGC) system which reduces the dynamic range of audio by applying varying gain to a signal depending on the instantaneous input magnitude. For any instantaneous input magnitude, the WDRC curve, shown in FIG. 9 (left), determines the desired instantaneous output magnitude. The WDRC curve is defined by a combination of parameters, which change the gain, the maximum power output, the "knee low" and "knee up (or knee high)" points, and the slope of the compression region. The reciprocal of the slope of the compression region is called the "compression ratio" (CR).

It is insufficient, however, to set the gain of each audio sample independently. Studies in acoustics and speech intelligibility have shown that the rate of change of WDRC gain has a strong effect on speech clarity and legibility. The rate of change of gain is measured using the attack and release times, which play a key role in the performance of WDRC. However, to the best of our knowledge, currently available hearing aids do not have an accurate mechanism for setting attack and release times independently of other parameters. For example, the attack and release times of the Kates system depend on the user-defined compression ratio, which gives rise to major inaccuracies.

In the following we discuss the complex relationship between the attack and release times of WDRC and the parameters defining a WDRC curve. We also propose a multirate compression algorithm which yields precise response times for the dynamics of the WDRC gains, in accordance with ANSI standards for any user-defined WDRC parameters.

Wide Dynamic Range Compression calculates compression gains based on the instantaneous input magnitude. However, sound is a modulating signal, meaning the magnitude of the signal is contained in the envelope. Common approaches to finding the envelope of a modulating signal include peak detection, per-frame total power, sliding RMS windows, and more. However, all these approaches introduce inaccuracies into the envelope estimate, such as ripple or excessive smoothing. We estimate the signal envelope by employing the Hilbert Transform. The Hilbert Transform accepts a real signal and computes a 90-degree phase shifted imaginary component.

The magnitude of the input signal is then found as the absolute value of the real and imaginary components.

The accuracy of the Hilbert Transform depends on the accuracy of the underlying Hilbert Filter, which is a filter that cuts off the negative frequencies of the signal spectrum. If the transition bandwidth of the Hilbert Filter overlaps with signal content, then the computed envelope becomes distorted.

As seen from FIG. 2, many of the channels are very close to DC, and preserving these frequencies would require an unrealistically sharp Hilbert Filter. However, we prevent distortion in the low-frequency bands by performing magnitude estimation and amplification in the multirate domain, as shown in FIG. 1. As we discussed earlier, reducing the sampling rate of a filter increases its relative width. However, for a given center frequency, reducing the sampling rate of the signal also moves said center frequency relatively farther from DC. As such, the channel is no longer affected by the Hilbert Filter's transition bandwidth.

Figure 8:
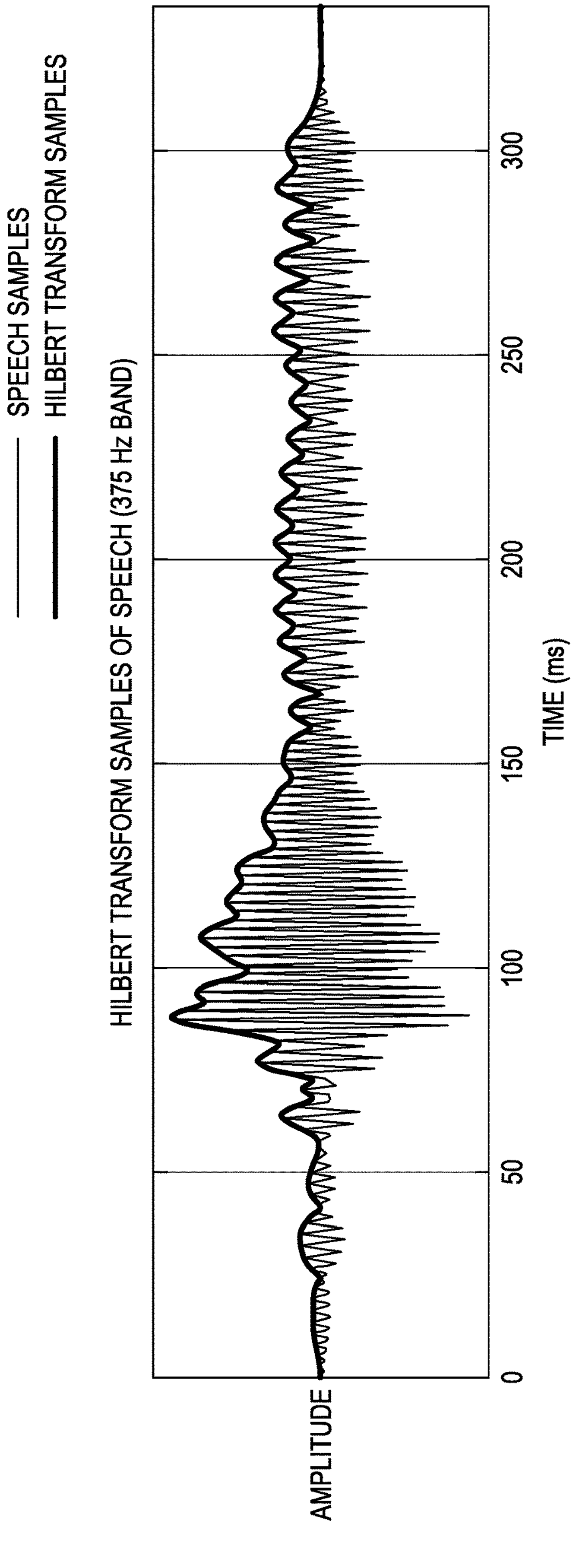
FIG. 8 shows the waveform and computed envelope of the word "please" in the 375 Hz band, spoken by a female voice.

The multirate Hilbert Transform produces highly accurate signal envelopes for all frequency channels of the filter bank. FIG. 8 shows the 0.375 kHz band of the word "please" spoken by a female voice from the TIMIT database, as well as the envelope of the waveform computed using the Hilbert Transform.

The ANSI S3.22 Specification of Hearing Aid Characteristics defines the attack and release times for hearing aid devices. Given a step input which changes magnitude from 55 dB to 90 dB, as shown in FIG. 10, the attack time is defined as the time elapsed between the step change and the time the output remains within 3 dB of its steady state value, notated as A2 in FIG. 10. Release time is similarly defined as the time elapsed between a step change from 90 dB to 55 dB, and the time the output remains within 4 dB of steady state, notated as A1. The steady-state values are obtained from the WDRC curve, shown in FIG. 9, and as such, depend on compression parameters.

Figure 7:
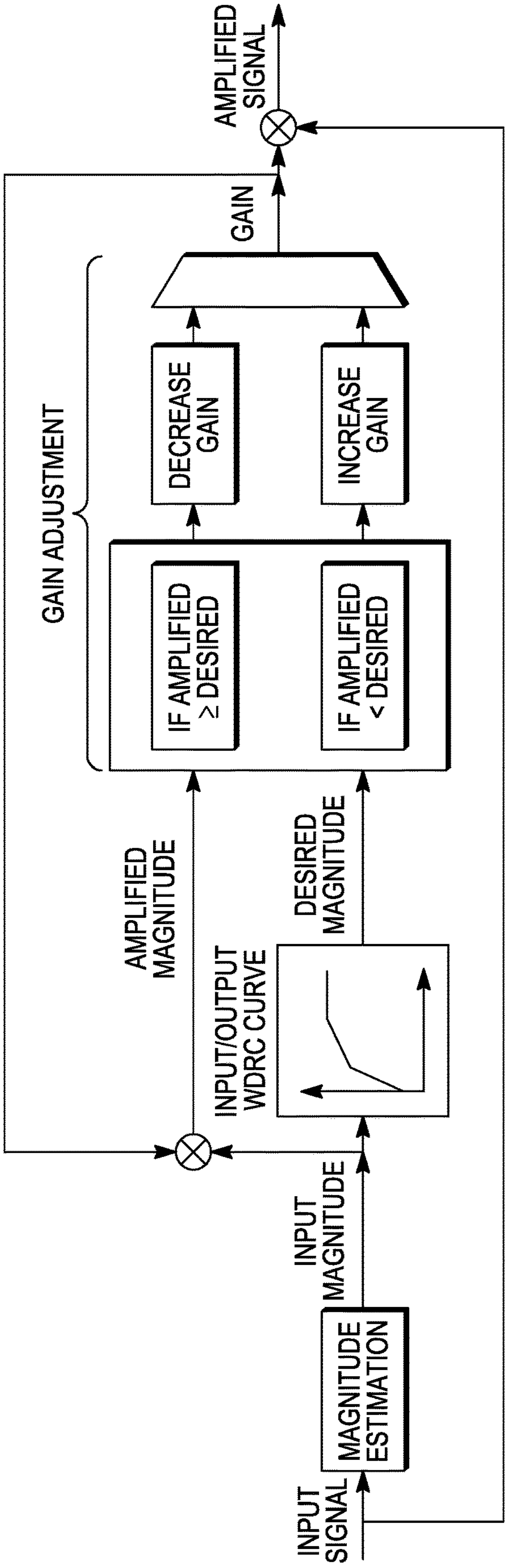
FIG. 7 is a function block diagram illustrating the general concept of Automatic Gain Control for WDRC.

The general concept of Automatic Gain Control for WDRC, illustrated in FIG. 7, is to decrease the gain when the output overshoots, and increase the gain when the output undershoots. However, since the steady state values A1 and A2 shown in FIG. 10 depend on user parameters, the overshoot and undershoot also depend on user compression parameters. Thus, there is a relationship between user input parameters and the response speed of an AGC loop which is not well explored in modern hearing aids and leads to significant error in actual attack and release times compared to desired values.

Figure 11:
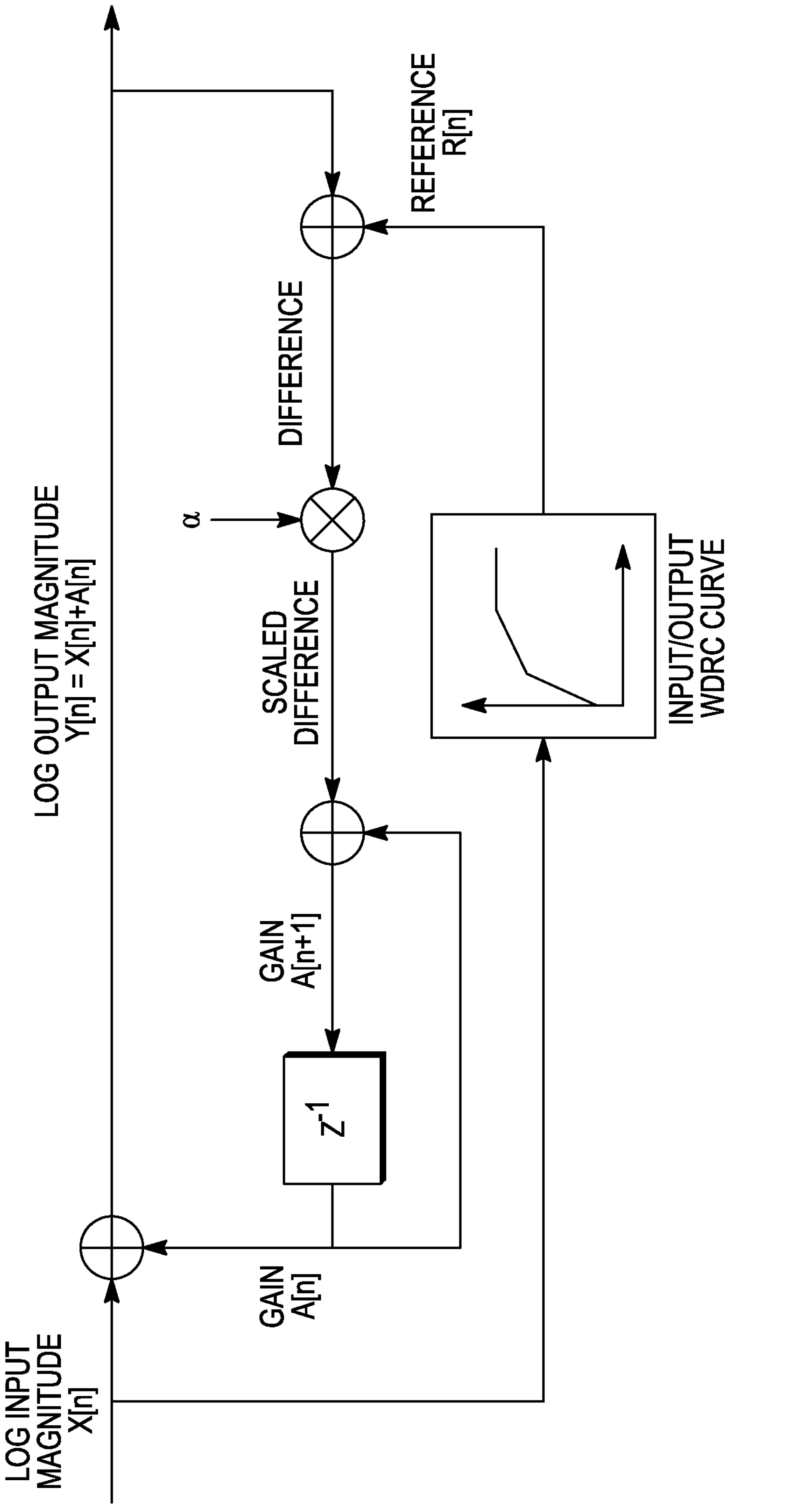
FIG. 11 is a block diagram of one example of the AGC algorithm.

We derived a closed-form relationship between user compression parameters (compression ratio) and the attack and release times of a hearing aid, and designed an Automatic Gain Control (AGC) loop which yields exact attack and release values for any user-defined compression parameters. Our design builds upon work in by adapting radio AGC to Wide Dynamic Range Compression. The block diagram of the AGC algorithm is shown in FIG. 11. For each input sample, the gain of the previous sample is added to the current sample. The sum is then compared to the desired output level based on the WDRC curve. The scaled difference between the desired and the actual output levels is then used to modify the gain of the next sample. In the AGC loop, alpha (α) is an important scaling parameter which determines how quickly the system reacts to changes. As such, a is the only parameter determining the attack and release times of the AGC loop. Since WDRC must respond differently to rising and falling input levels, the AGC loop requires two distinct values of α—one for attack time, one for release time.

In this section, we derive the relationship between α and WDRC parameters such that the system yields exact attack and release times in any configuration. The behavior of the system above is described by the equation below.

$$\begin{aligned} A[n+1] &= A[n] + \alpha \times (R[n] - Y[n]) = \\ &= A[n] + \alpha \times (R[n] - (X[n] + A[n])) \\ &= A[n] \times (1-\alpha) + \alpha \times (R[n] - X[n]) \end{aligned} \tag{1}$$

Consider the ANSI test signal, which is a step input which changes magnitude from 55 dB to 90 dB at time n=0. Let us define $G_0$ as the initial steady state gain before the step change. For n≤0, R[n]=A1, X[n]=55, so $G_0$=R[n]−X[n]=A1-55.

Let us define $G_\infty$ as the final steady state gain after the step change. For all times n≥0, R[n]=A2, X[n]=90, so $G_\infty$=R[n]−X[n]=A2-90. Using these definitions, for all n≥0, equation 1 can be rewritten as:

$$A[n+1] = A[n] \times (1-\alpha) + \alpha \times G_\infty \tag{2}$$

In order to gain insight into the behavior of the system, let us write out the gains of the first few samples:

$$A[0] = G_0 \tag{3a}$$

$$A[1] = G_0 \times (1-\alpha) + \alpha \times G_\infty \tag{3b}$$

$$A[2] = G_0 \times (1-\alpha)^2 + \alpha \times G_\infty \times (1-\alpha) + \alpha \times G_\infty \tag{3c}$$

$$A[3] = G_0 \times (1-\alpha)^3 + \alpha \times G_\infty \times (1-\alpha)^2 + \alpha \times G_\infty \times (1-\alpha) + \alpha \times G_\infty \tag{3d}$$

As seen from the pattern formed in equation 3, the gain of the n'th sample is found as a geometric series, shown in equation 4a and simplified in equation 4b.

$$A[n] = G_0 \times (1-\alpha)^n + \alpha \times G_\infty \times \left(1 + (1-\alpha) + (1-\alpha)^2 + \ldots + (1-\alpha)^{n-1}\right) \tag{4}$$

$$\begin{aligned} A[n] &= G_0 \times (1-\alpha)^n + \alpha \times G_\infty \times \frac{1-(1-\alpha)^n}{\alpha} \\ &= G_0 \times (1-\alpha)^n + G_\infty \times (1-(1-\alpha)^n) \\ &= (G_0 - G_\infty) \times (1-\alpha)^n + G_\infty \end{aligned}$$

This important result provides us with an equation for gain as a function of time and α. As expected, at time n=0 the gain is equal to $G_0$, and as n reaches infinity the gain approaches $G_\infty$.

Using the equation above, we can use known values of n to solve for α. As explained earlier, α is the only parameter which sets the attack and release times of the AGC system. Let AT represent the attack time. From the ANSI definition of attack time, we know that at time n=AT, the gain needs to be within 3 dB of steady state, which is $G_\infty$+3. Substituting these values into equation 4b yields:

$$G_\infty + 3 = (G_0 - G_\infty) \times (1-\alpha)^{AT} + G_\infty \tag{5}$$

The equation above contains only one unknown variable, allowing us to solve for $\alpha_{attack}$:

$$\begin{aligned} \alpha_{attack} &= 1 - \left(\frac{3}{G_0 - G_\infty}\right)^{\frac{1}{AT}} \\ &= 1 - \left(\frac{3}{A1 - A2 + 35}\right)^{\frac{1}{AT}} \end{aligned} \tag{6}$$

Following similar steps and using the ANSI definition for release time, we can find a similar expression for $\alpha_{release}$:

$$\begin{aligned} \alpha_{release} &= 1 - \left(\frac{4}{G_0 - G_\infty}\right)^{\frac{1}{RT}} \\ &= 1 - \left(\frac{4}{A1 - A2 + 35}\right)^{\frac{1}{RT}} \end{aligned} \tag{7}$$

Equations 6 and 7 provide us with values for $\alpha_{attack}$ and $\alpha_{release}$ that guarantee exact attack and release times for the AGC loop. It is important to note that in equation and 7, the units for AT and RT are samples. Samples and milliseconds are related to each other through sampling rates which, as described earlier, varies between the different subbands.

It can be noted that the difference $G_0$–$G_\infty$ is none other than the Overshoot pictured in FIG. 10. The Overshoot is a variable which depends on the parameters setting the WDRC curve. By deriving the relationship between α and Overshoot, we account for all WDRC parameters, including compression ratio, in our calculations for attack and release times.

Figure 9:
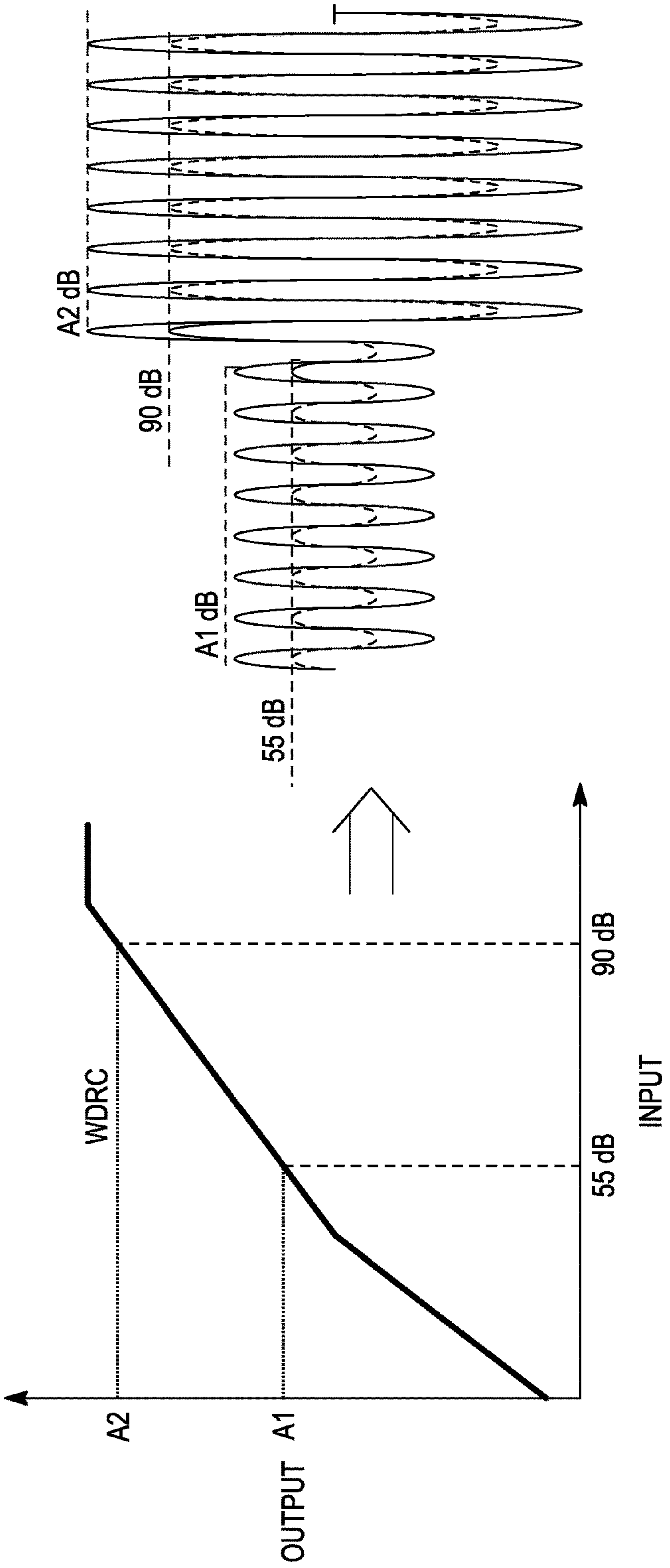
FIG. 9 shows a WDRC curve in which the ANSI 3.22 standard attack and release times of hearing aids are measured using a sinusoidal step input changing from 55 dB to 90 dB.
Figure 10:
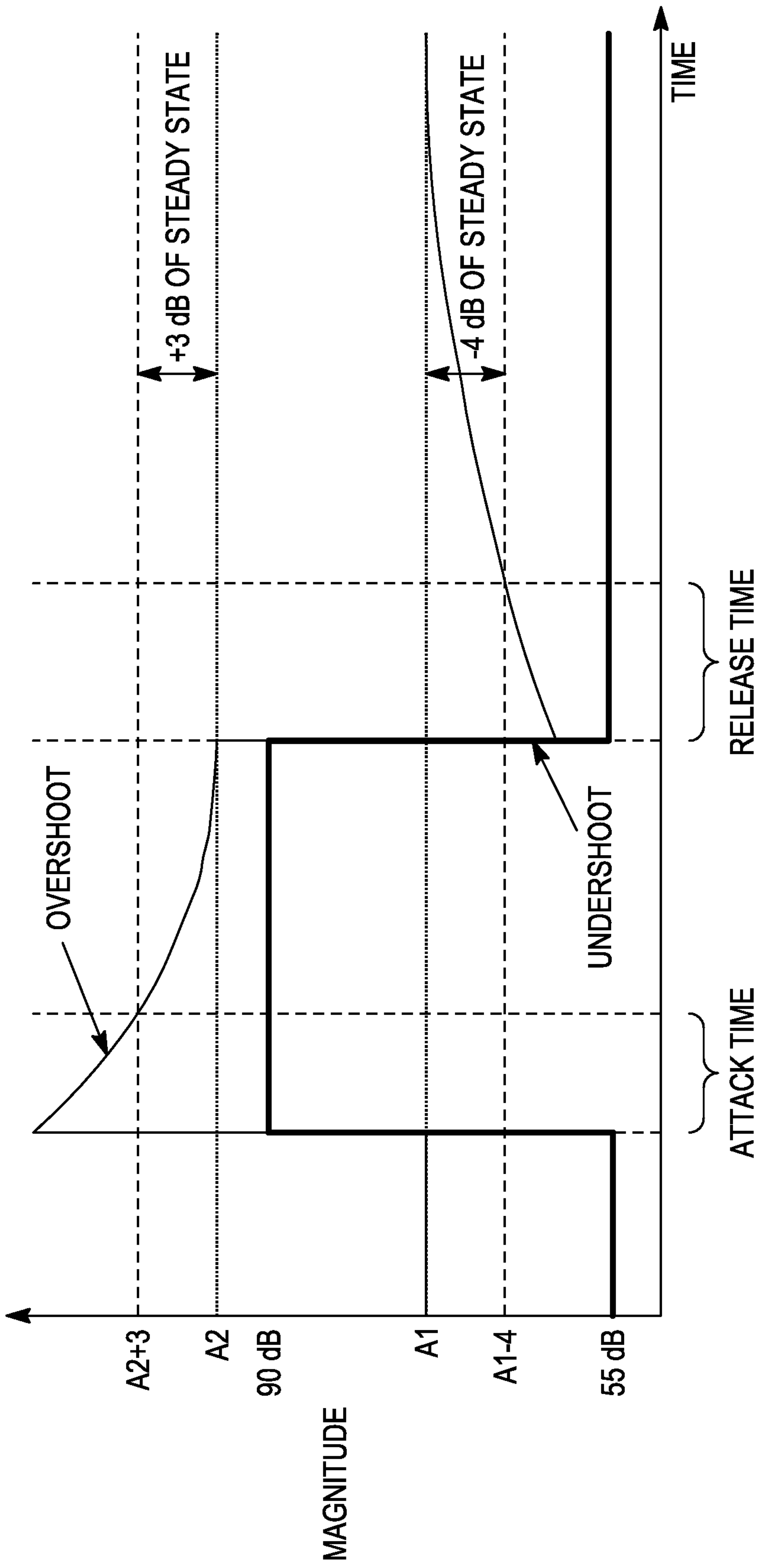
FIG. 10 illustrates the ANSI standard attack time, which is measured as the time it takes for the overshoot to settle within 3 dB of steady state and the release time, which is measured as the time is takes for the undershoot to settle within 4 dB of steady state.

Another feature of the AGC loop, shown in FIG. 11, is that the reference signal R[n] needs to be a piecewise curve, as shown in FIG. 9. The piecewise input-output WDRC curve benefits from simplicity, but our system can accept any function for the input-output curve, including smooth continuous functions and 'S' curves. This flexibility allows the user to employ other input-output curves, which may be more appropriate for the user.

Illustrative Results

For purposes of illustrating the systems and techniques described herein and not as limitation thereon, the audiometric filter bank has been integrated into the Open Speech Platform (OSP), which is an open-source suite of hardware and software tools for conducting research into many aspects of hearing loss both in the lab and the field. The hardware system includes of a battery-operated wearable device running a Qualcomm 410*c* processor, similar to those in cellphones, with two ear-level assemblies attached—one for each ear.

At the core of OSP software is the real-time Master Hearing Aid (RT-MHA) reference design. Initially, the incoming audio signal from the microphones is sampled at 48 kHz and is then downsampled to 32 kHz (not to be confused with the resamplers present in the channelizer). The audio signal is then routed to the channelizer.

The outputs of the channelizer then pass through the WDRC unit to compensate for the user's hearing loss. Then the amplified outputs are recombined and passed through a Global Maximum Power Output (MPO) controller in order to limit the power outputted by the speaker. Finally, the audio is upsampled from 32 kHz back to 48 kHz and outputted through the speakers. Additionally, the RT-MHA reference design contains Adaptive Feedback Cancellation (AFC) in order to compensate for the feedback arising from the close proximity of the microphone and the speaker. More detailed explanations of the RT-MHA components can be found in L. Pisha et al., "A wearable, extensible, open-source platform for hearing healthcare research," IEEE Access, vol. 7, pp. 2019, and D. Sengupta et al., "Open speech platform: Democratizing hearing aid research," in Proceedings of the 14th EAI International Conference on Pervasive Computing Technologies for Healthcare, 2020.

We evaluated the design using the widely accepted Audioscan Verifit 2 Professional Verification system. Verifit 2 is a verification tool consisting of a soundproof binaural audio chamber, a display unit, and a set of powerful testing procedures, such as speech map, ANSI tests, and distortion.

We conducted steady state input-output measurements to evaluate the multirate amplification system running on Open Speech Platform hardware. The purpose of this test is to compare the experimentally measured input-output curve of our device to the ideal target curve specified by a hearing loss prescription. In this experiment, the hearing aid device is placed into the soundproof audio chamber. The Verifit's reference speaker plays calibrated audio signals with known acoustical properties into the hearing aid microphone, which becomes the input signal for the hearing aid. The processed output signal of the hearing aid is then collected by the Verifit's coupler microphone and is compared to the input signal to identify the measured gain.

Figure 12:
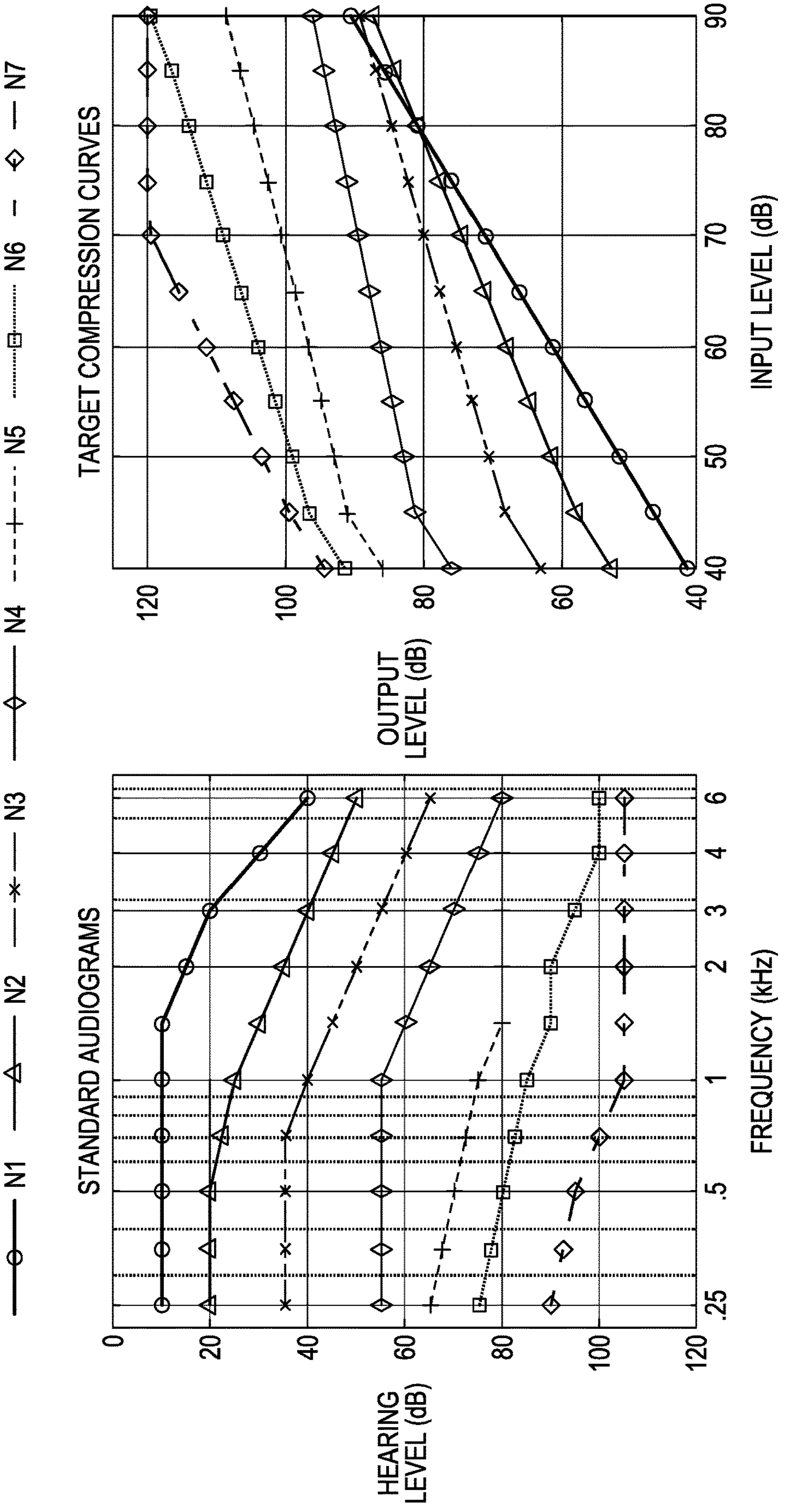
FIG. 12 shows some of the ISMADHA standard pure tone audiograms and an example of the obtained target input/output amplification curves for each audiogram at 1 kHz.

We verified our system using seven of the ten standard pure tone audiograms developed by the International Standard for Measuring Advanced Digital Hearing Aids (ISMADHA) group, which represent a broad class of hearing loss patterns, from very mild to profound. We obtained compression parameters for a subset of ISMADHA using the NAL-NL2 Prescription Procedure, which is a widely accepted algorithm for generating hearing aid prescriptions from pure tone audiograms. FIG. 12 shows the ISMADHA standard pure tone audiograms, and an example of the obtained target input/output amplification curves for each audiogram at 1 KHz.

We performed steady state measurements at the eleven half-octave frequencies offered by the audiometric filter bank. For each frequency, we obtained the target compression curves, such as the ones shown in FIG. 12. We then took measurements for each combination of audiogram, frequency, and input level, resulting in 847 data points. Table 3 shows the maximum and average errors we obtained for each audiogram as a function of frequency. Our results show that the compressed output values closely match the desired target values, often with 0 dB average error. The maximum error (usually found in the maximum power output or MPO region) is also small, and never exceeds 3 dB, which was shown to be the threshold of just noticeable difference in speech-to-noise ratio.

TABLE 3

| | | | Average (dB) | | | | | | | | | | |
|---|---|---|---|---|---|---|---|---|---|---|---|---|---|
| No. | Category | Max (dB) | 250 | 354 | 500 | 707 | 1000 | 1414 | 2000 | 2828 | 4000 | 5657 | 8000 |
| N1 | Very Mild | 0.5 | 0.0 | −0.2 | 0.0 | −0.2 | 0.0 | 0.0 | −0.1 | −0.1 | −0.3 | 0.0 | −0.2 |
| N2 | Mild | 1.0 | −0.1 | −0.4 | 0.1 | 0.0 | −0.1 | 0.0 | −0.1 | −0.1 | −0.3 | 0.2 | 0.1 |
| N3 | Moderate | 1.5 | −0.1 | −0.3 | 0.1 | 0.0 | 0.1 | 0.1 | 0.0 | 0.0 | −0.1 | 0.0 | 0.3 |
| N4 | Mod/Severe | 2.0 | 0.0 | 0.5 | 0.1 | 0.5 | 0.5 | 0.5 | 0.4 | −0.1 | 0.0 | 0.0 | 0.5 |
| N5 | Severe | 1.5 | −0.1 | −0.1 | 0.1 | 0.0 | 0.0 | 0.3 | 0.1 | −0.1 | 0.0 | −0.1 | 0.2 |
| N6 | Severe | 2.0 | −0.1 | −0.1 | 0.2 | 0.0 | 0.2 | 0.3 | 0.2 | −0.2 | −0.1 | −0.2 | 0.4 |
| N7 | Profound | 3.0 | 0.2 | −0.3 | 0.0 | 0.1 | 0.0 | 0.2 | −0.1 | −0.4 | 0.2 | −0.1 | 0.3 |

Comparison with Other Work

We compared the (i) Multirate Audiometric Filter Bank and (ii) Multirate Wide Dynamic Range Compression System with the Kates Digital Hearing Aid, one of the most popular open-source tools for hearing aid research.

Figure 14:
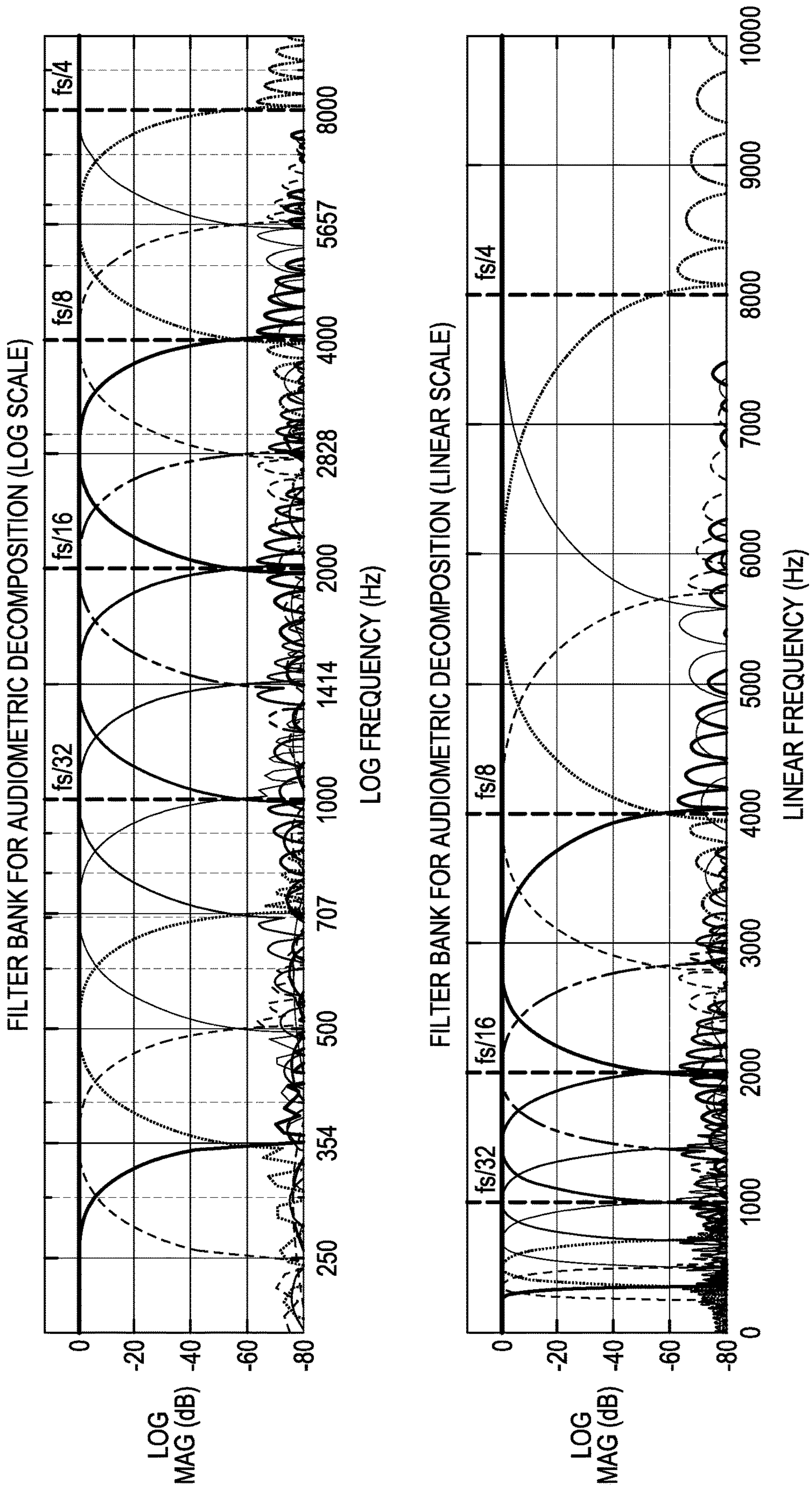
FIG. 14 compares the magnitude responses of the proposed audiometric filter bank in long frequency (top) and linear frequency (bottom).

In one aspect, the systems and techniques described herein improve the spectral resolution of hearing aids. FIG. 14 compares the magnitude responses of the proposed multirate, audiometric filter bank (top) and the Kates 6-band filter bank (bottom). In addition to offering more bands, the multirate filter bank also offers better filter sharpness. Although most of Kates's filter satisfy ANSI S3.22 class 0 requirements, the filters lose their sharpness at lower frequencies, and the 500 Hz filter does not satisfy the requirements for any of the ANSI S3.22 classes. As demonstrated in FIG. 14 (top), the multirate system meets Class 0 requirements, the strangest of the ANSI S3.22 standard.

Figure 13:
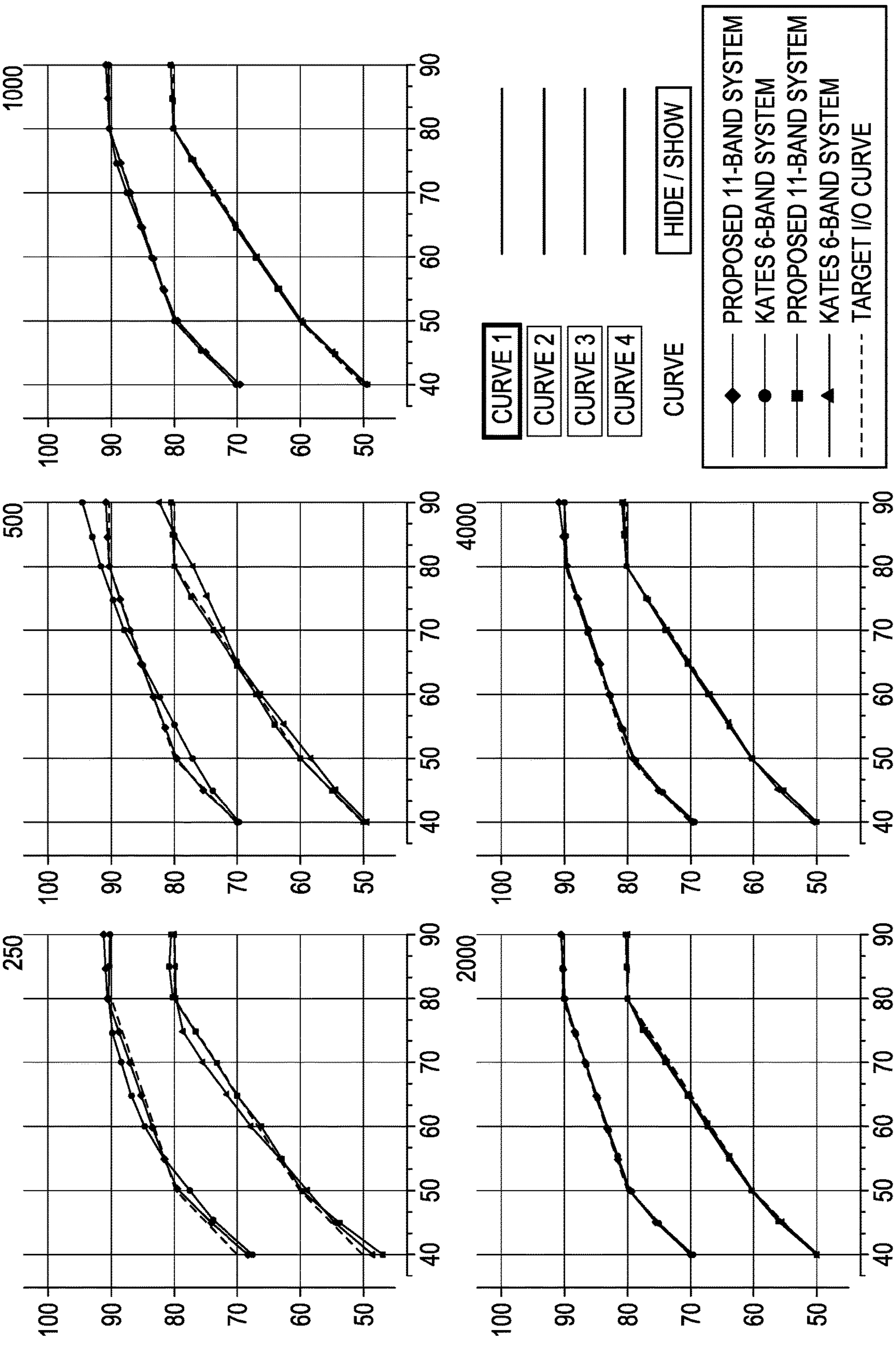
FIG. 13 shows Verifit Verification Toolbox measurements comparing the steady state behavior of the multirate 11-band system and the Kates 6-band system.

We also used the Verifit's input-output curve feature to compare the prescription accuracy of the multirate eleven-band system versus the Kates system. FIG. 13 shows two target compression curves and the six band versus eleven band realizations. At higher frequencies, both realizations accurately fulfill the target prescription. However, at lower frequencies below 1000 Hz, the Kates implementation begins to diverge from the target curve, and both the 250 and 500 Hz bands lose their shape integrity. This is due to the high side lobes of the of low frequency bands seen in FIG. 14.

Table 4 compares the complexity and latency of the Kates filter bank and the eleven-band filter bank. In addition to offering almost twice the number of bands compared to Kates's filter bank, the proposed filter bank achieves about 3.5 times reduction in complexity, with a comparable algorithmic latency of 5.43 ms.

TABLE 4

| Filter Bank | Bands | Operations per sample | Latency |
|---|---|---|---|
| Proposed OSP Filter Bank | 11 | 437.69 | 5.43 ms |
| Kates Filter Bank | 6 | 1542 | 4.03 ms |

We also compared our Multirate Multiband Automatic Gain Control with Kates's approach. As described above the relationship between WDRC parameters and AGC response times are not explored in previous works. In the Kates approach, the AGC response times are controlled by the coefficients of the peak detector used to estimate the signal magnitude. The resulting coefficients are approximated to meet ANSI attack and release time standards, but diverge from target values significantly.

Figure 15:
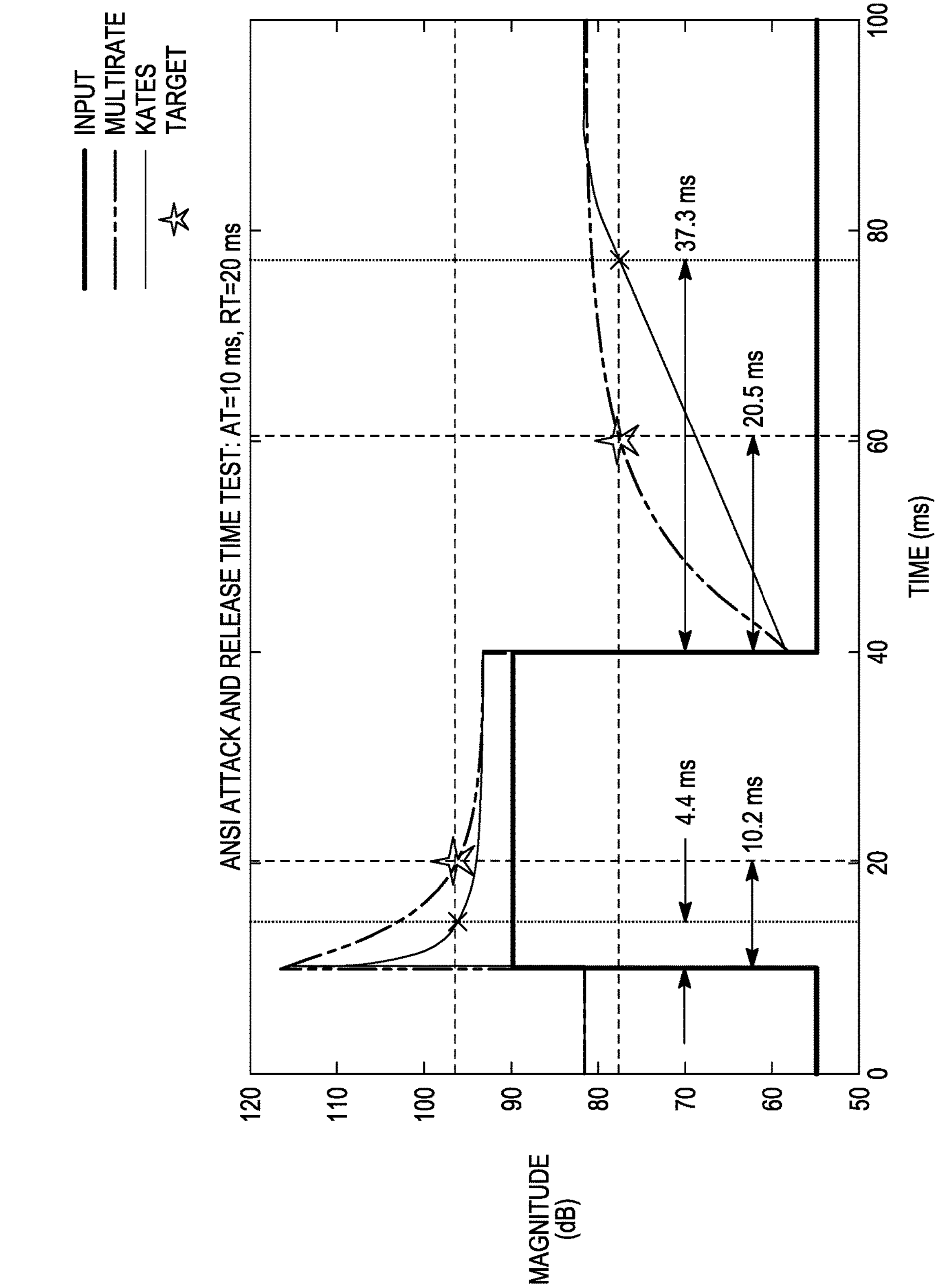
FIG. 15 compares the dynamic responses of the multirate system described herein and the Kates system.

As a test case, FIG. 15 compares the dynamic responses of the multirate system described herein and the Kates system. The input is a gated sinusoid test signal stepping between 55 and 90 dB, as defined by the ANSI S3.22 standard, centered at 2000 Hz. Both systems were configured to have a compression ratio of 3:1, and the attack and release times were set to 10 ms and 20 ms respectively. The dynamic responses of the two systems are shown in FIG. 15.

In this example, the measured attack and release times of the Multirate system are 10.2 ms and 20.5 ms respectively, which deviate from the target values by 0.2 ms (2%) and 0.5 ms (2.5%). On the other hand, the measured attack and release times of the Kates system are 4.4 ms and 37.3 ms respectively, which is a 5.6 ms (45%) and 17.3 ms (87%) deviation from the target values. This experiment shows that the Multirate system described herein satisfies attack and release times within 0.5 ms of the target value. However, the Kates system yields attack and release time values that significantly diverge (by orders of magnitude) from the target. Furthermore, this error is unpredictable because the internal coefficients responsible for attack and release times of the Kates system are designed to be "fudge" factors.

The Multirate systems described herein offer very accurate fulfillment of user (e.g., audiologist) designated attack and release times. However, neither the current standards nor popular HA prescription tools provide guidance for the dynamic aspects of dynamic range compression.

CONCLUSION

In summary, a real-time multirate, multiband amplification system for hearing aids has been described herein. The system improves upon the prescription accuracy of hearing aids and provides an open-source tool for hearing loss research.

We designed a channelizer offering eleven frequency sub-bands centered at the standard frequencies used in pure-tone audiometry, with high side-lobe attenuation and low ripple. This high frequency allows our hearing aid system to accurately satisfy hearing aid prescriptions, even for complex and unusual hearing loss patterns. The × channelizer uses multirate processing to reduce the complexity by about 14 compared to a single-rate implementation. By employing minimum-phase filters, we decreased the latency of our filter bank to 5.43 ms, which is within the conventional threshold for modern hearing aids.

We also designed an automatic gain control (AGC) system which provides accurate control of the steady state and dynamic behavior of dynamic range compression. We use the Hilbert Transform to find the instantaneous signal magnitude, which provides higher accuracy than conventional instantaneous power estimation methods. Furthermore, we derived the closed-form relationship between the compression parameters of our AGC loop, and the attack and release times at the output. The accurate fulfilment of attack and release times in dynamic range compression opens new opportunities for exploring the relationship between response times and hearing impaired users' satisfaction.

In one example, the Multirate Multiband Amplification System was implemented on Open Speech Platform—an open-source suite of hardware and software tools for hearing loss research. The system runs in real-time on a wearable device and is suited for hearing loss research both in the lab and in the field.

The particular systems and methods described above have been presented for illustrative purposes and not as a limitation on the subject matter described herein. More generally, in one aspect, a method is presented for performing frequency sub channelization. In accordance with the method, a digital signal is received at an original sampling rate. A plurality of multirate frequency channels is produced by dividing the digital signal into an integer number of multirate frequency channels such that a sampling rate of each of the multirate frequency channels is proportional to a center frequency of the frequency channel. Signal processing is performed on each of the multirate frequency channels. The original sampling rate is reconstructed using the multirate frequency channel.

In some embodiments the digital signal is a digital audio signal and dividing the digital audio signal into an integer number of multirate frequency channels includes dividing the digital audio signal into an integer number of multirate frequency channels per octave.

In some embodiments the method further includes recombining the upsampled multirate frequency channels.

In some embodiments the signal processing performed on each of the multirate frequency sub-bands includes automatic gain control (AGC) for wide dynamic range compression (WDRC).

In some embodiments the AGC for WDRC uses an algorithm that has a closed form relationship between user compression parameters and compression gains and compression attack and release times.

In some embodiments each respective multirate frequency channel is sampled at a rate that is proportional to a frequency of an octave to which the multirate frequency channel belongs.

In another aspect, a hearing aid device is presented. The hearing aid includes a microphone, a multi-band hearing aid processing circuit, and a speaker. The microphone is configured to receive an audible input signal from an environment and convert the audible input signal to an electrical audio input signal. The multi-band hearing aid processing circuit is configured for processing the electrical audio input signal. The multi-band hearing aid processing circuit is further configured to: receive the electrical audio input signal and produce a digital signal at an original sampling rate; produce a plurality of multirate frequency channels that divide the digital signal into an integer number of multirate frequency channels per octave; perform envelope detection on each of the multirate frequency channels; perform automatic gain control (AGC) for WDRC using the detected envelope of each of the multirate frequency channels using an algorithm that has a closed form relationship between user compression parameters and compression gains and compression attack and release times; upsample the multirate frequency channels to the original sampling rate; and recombine the upsampled multirate frequency channels to produce an electrical audio output signal. The speaker is configured to receive the electrical audio output signal from the multi-band hearing aid processing circuit and emit an audible output signal into an ear of a user.

In some embodiments the envelope detection is performed using a Hilbert Transform.

In some embodiments the Hilbert Filter utilized in the Hilbert Transform is a minimum phase Hilbert Filter.

In some embodiments the envelope detection is performed using a peak detector.

In some embodiments the envelope detection is performed using a frame-based power estimation technique.

The claimed subject matter may be implemented as a method, apparatus, or article of manufacture using standard programming and/or engineering techniques to produce software, firmware, hardware, or any combination thereof to control a computer to implement the disclosed subject matter. For instance, the claimed subject matter may be implemented as a computer-readable storage medium embedded with a computer executable program, which encompasses a computer program accessible from any computer-readable storage device or storage media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). However, computer readable storage media do not include transitory forms of storage such as propagating signals, for example. Of course, those skilled in the art will recognize many modifications may be made to this configuration without departing from the scope or spirit of the claimed subject matter.

Some of the elements described in the disclosed embodiments may be implemented as modules that define an isolatable element that performs a defined function and has a defined interface to other elements. The blocks described in this disclosure may be implemented as modules in hardware, a combination of hardware and software, firmware, or a combination thereof. For example, modules may be implemented using computer hardware in combination with software routine(s) written in a computer language (MATLAB, Java, HTML, XML, PHP, Python, ActionScript, JavaScript, Ruby, Prolog, SQL, VBScript, Visual Basic, Perl, C, C++, Objective-C or the like). Additionally, it may be possible to implement modules using physical hardware that incorporates discrete or programmable analog, digital and/or quantum hardware. Examples of programmable hardware include: computers, microcontrollers, microprocessors, application-specific integrated circuits (ASICs), field programmable gate arrays (FPGAs), and complex programmable logic devices (CPLDs). Computers, microcontrollers and microprocessors are programmed using languages such as assembly, C, C++ or the like, FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies may be used in combination to achieve the result of a functional module.

In addition, it should be understood that any figures that highlight any functionality and/or advantages, are presented for example purposes only. The disclosed architecture is sufficiently flexible and configurable, such that it may be utilized in ways other than that shown. For example, instructions listed in any block may be re-ordered, combined with other instructions, or only optionally used in some embodiments.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein but may be modified within the scope and equivalent of the appended claims.

The invention claimed is:

1. A method for performing frequency sub channelization, comprising:
- receiving a digital signal at an original sampling rate;
- producing a plurality of multirate frequency channels by dividing the digital signal into an integer number of multirate frequency channels such that a sampling rate of each of the multirate frequency channels is proportional to a center frequency of the frequency channel;
- performing signal processing on each of the multirate frequency channels; and
- reconstructing the original sampling rate using the multirate frequency channels.

2. The method of claim 1 wherein the digital signal is a digital audio signal and further wherein dividing the digital audio signal into an integer number of multirate frequency channels includes dividing the digital audio signal into an integer number of multirate frequency channels per octave.

3. The method of claim 1 further comprising recombining the upsampled multirate frequency channels.

4. The method of claim 1 wherein the signal processing performed on each of the multirate frequency sub-bands includes automatic gain control (AGC) for wide dynamic range compression (WDRC).

5. The method of claim 4 wherein the AGC for WDRC uses a closed form relationship between user compression parameters and compression gains and compression attack and release times.

6. The method of claim 1 wherein each respective multirate frequency channel is sampled at a rate that is proportional to a frequency of an octave to which the multirate frequency channel belongs.

7. A hearing aid device, comprising:
- a microphone configured to receive an audible input signal from an environment and convert the audible input signal to an electrical audio input signal;
- a multi-band hearing aid processing circuit configured for processing the electrical audio input signal, the multi-band hearing aid processing circuit being further configured to:

receive the electrical audio input signal and produce a digital signal at an original sampling rate;

produce a plurality of multirate frequency channels that divide the digital signal into an integer number of multirate frequency channels per octave;

perform envelope detection on each of the multirate frequency channels;

perform automatic gain control (AGC) for WDRC using the detected envelope of each of the multirate frequency channels using an algorithm that has a closed form relationship between user compression parameters and compression gains and compression attack and release times;

upsample the multirate frequency channels to the original sampling rate;

recombine the upsampled multirate frequency channels to produce an electrical audio output signal; and a speaker configured to receive the electrical audio output signal from the multi-band hearing aid processing circuit and emit an audible output signal into an ear of a user.

8. The hearing aid device of claim 7 wherein the envelope detection is performed using a Hilbert Transform.

9. The hearing aid device of claim 8 wherein the Hilbert Filter utilized in the Hilbert Transform is a minimum phase Hilbert Filter.

10. The hearing aid device of claim 7 wherein the envelope detection is performed using a peak detector.

11. The hearing aid device of claim 7 wherein the envelope detection is performed using a frame-based power estimation technique.

* * * * *